(12) United States Patent
Burns et al.

(10) Patent No.: US 9,043,916 B1
(45) Date of Patent: *May 26, 2015

(54) SECURITY CONTENT INJECTION

(71) Applicant: Juniper Networks, Inc., Sunnyvale, CA (US)

(72) Inventors: Bryan Burns, Portland, OR (US); Alexander S. Waterman, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,920

(22) Filed: Dec. 26, 2013

Related U.S. Application Data

(63) Continuation of application No. 13/333,358, filed on Dec. 21, 2011, now Pat. No. 8,621,621.

(51) Int. Cl.
*G06F 12/14* (2006.01)
*H04L 29/06* (2006.01)

(52) U.S. Cl.
CPC .................. *H04L 63/145* (2013.01)

(58) Field of Classification Search
CPC ......... G06F 12/14; G06F 21/54; H04L 63/14; H04L 63/1408; H04L 63/145; H04L 63/1466
USPC ................................................. 726/22, 23, 24
See application file for complete search history.

(56) References Cited

U.S. PATENT DOCUMENTS

| 8,621,621 | B1 | 12/2013 | Burns et al. | |
|---|---|---|---|---|
| 2007/0192857 | A1* | 8/2007 | Ben-Itzhak | 726/22 |
| 2010/0024033 | A1* | 1/2010 | Kang et al. | 726/23 |
| 2010/0218253 | A1* | 8/2010 | Sutton et al. | 726/23 |
| 2010/0299754 | A1* | 11/2010 | Amit et al. | 726/24 |
| 2011/0239300 | A1* | 9/2011 | Klein et al. | 726/23 |

* cited by examiner

*Primary Examiner* — Matthew Smithers
(74) *Attorney, Agent, or Firm* — Harrity & Harrity, LLP

(57) ABSTRACT

A computing device may receive content from a content source. The content may include software code that is executable by a web browser, and may be directed to another computing device. The computing device may inject security content into the content. The security content may include software instructions to enable the web browser to detect malicious software content within the content. The computing device may communicate the content to the other computing device.

20 Claims, 8 Drawing Sheets

SECURITY CONTENT INJECTION

RELATED APPLICATION

This application is a continuation of U.S. patent application Ser. No. 13/333,358, filed Dec. 21, 2011, now U.S. Pat. No. 8,621,621, the disclosure of which is incorporated herein by reference.

BACKGROUND

Malicious software is frequently delivered to computing devices via web browsers. For example, a computer virus can be embedded within web pages so that, when the web page accessed by a computer via a web browser, the computer virus becomes active within the computer. Unfortunately, currently available solutions for protecting computing devices against malicious software are inadequate. For example, some security solutions require computing devices to execute processor and memory intensive logic, in addition to requiring frequent updates in order to remain effective.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to protect computing devices from malicious software content.

Figure 1:
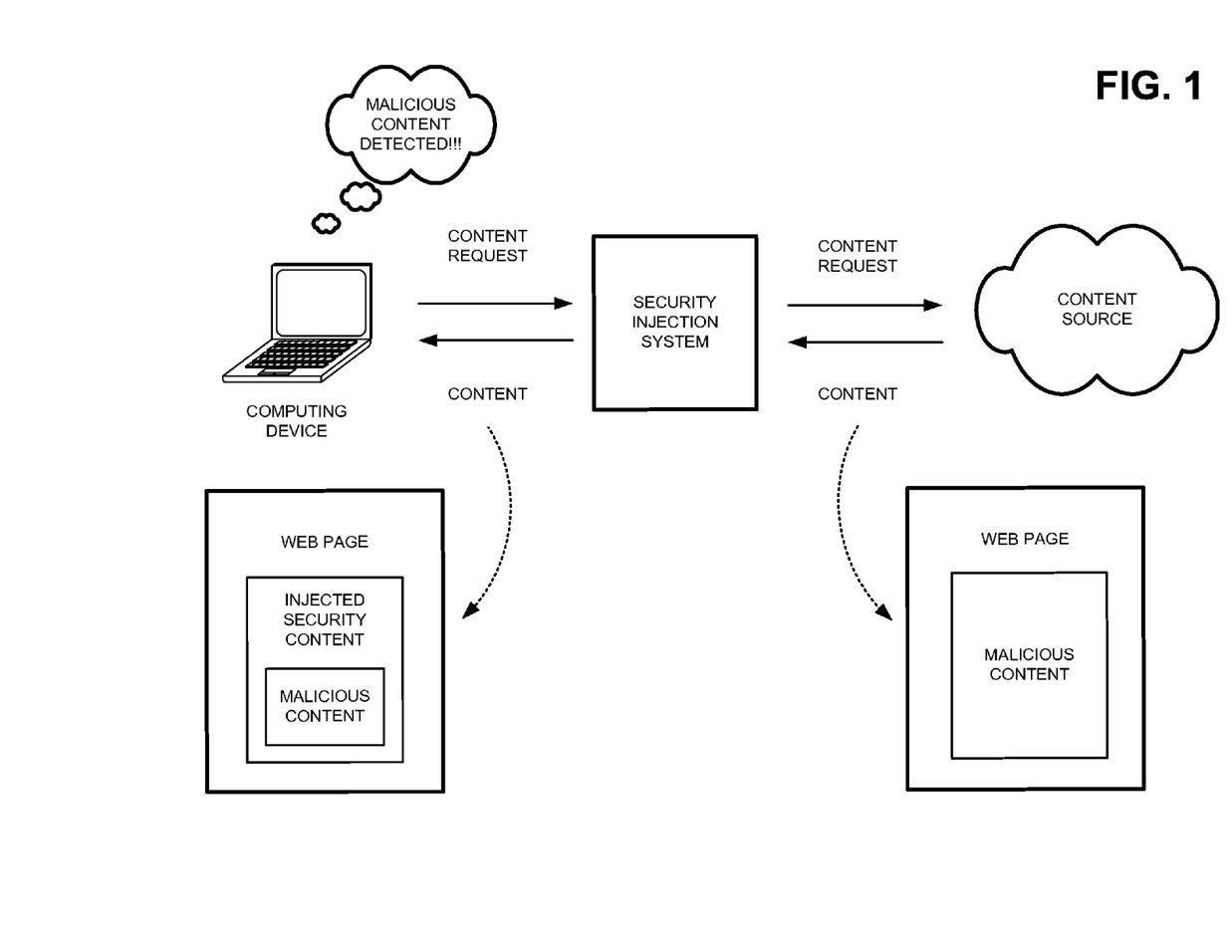
FIG. 1 is a diagram of an example overview of an implementation described herein.

FIG. 1 is a diagram of an example overview of an implementation described herein. As depicted in FIG. 1, a computing device may request content from a content source. The content source may respond to the content request by providing content to the computing device. The communications between the computing device and the content source may be relayed by the security injection system. As depicted in FIG. 1, the content requested by the computing device may include a web page, and the content source may include a web server. In addition, the web page may include malicious content, such as a software virus, spyware, or another type of malware.

As depicted in FIG. 1, the web page sent by the content source to the computing device may include malicious content, such as a virus, spyware, or another type of malware. The security injection system may receive the web page from the content source and inject security content into the web page. The security injection system may forward the web page to the computing device, and the computing device may proceed to view the web page in a web browser. The web browser may execute the injected security content in the web page, which may include a process capable of detecting the malicious content without exposing the computing device to the malicious content. Upon detecting the malicious content, the injected security content may, for example, notify the computing device of the malicious so that the malicious content may be removed, quarantined, or otherwise prevented from operating within the computing device. As such, one or more of the implementations described herein provide solutions for protecting computing devices against viruses, spyware, and other type of malicious content.

Figure 2:
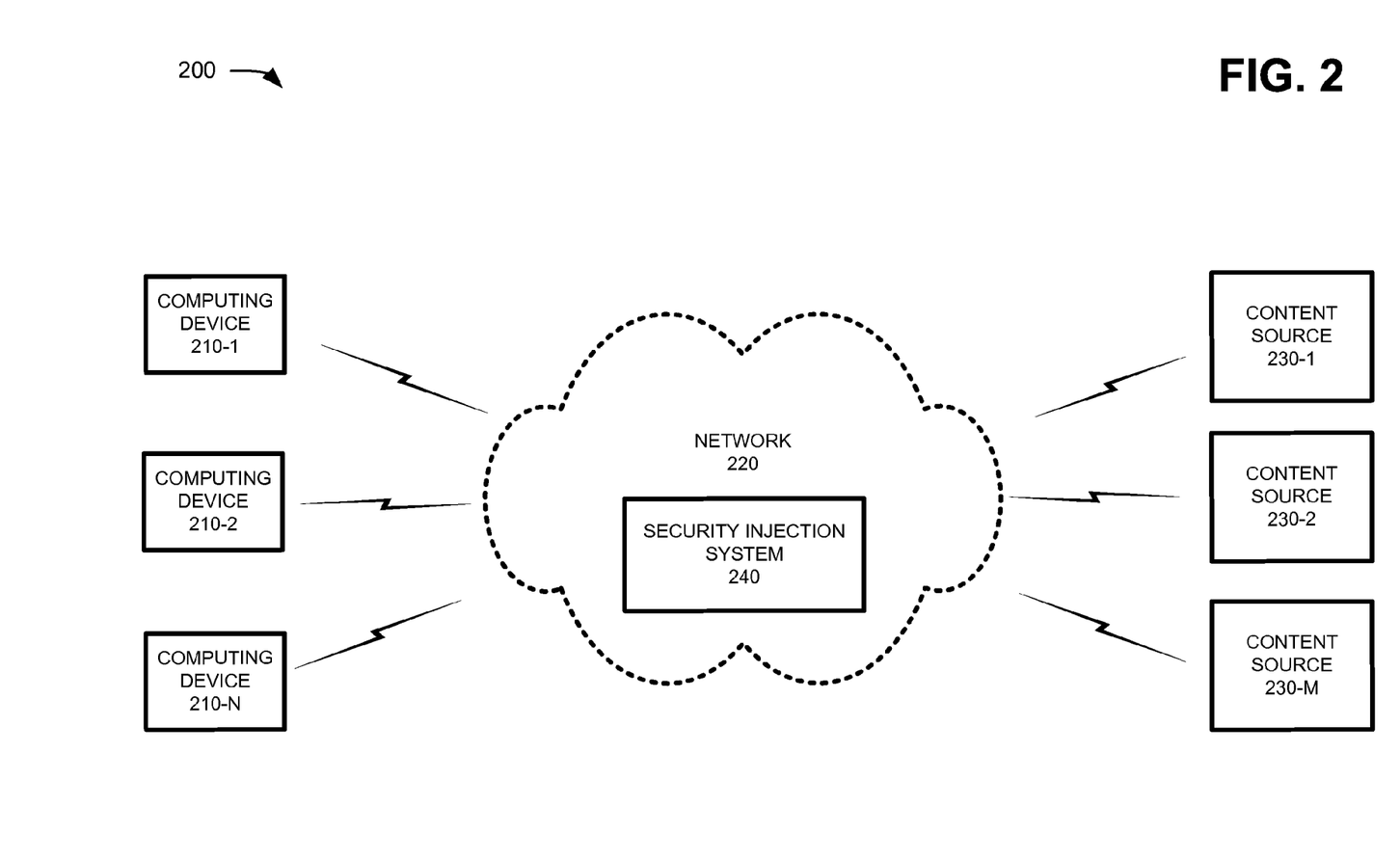
FIG. 2 is a diagram of an example environment in which systems and/or methods, described herein, may be implemented.

FIG. 2 is a diagram of an example environment 200 in which systems and/or methods, described herein, may be implemented. As depicted, environment 200 may include user devices 210-1, 210-2, . . . , 210-N (where N≥1) (hereinafter referred to collectively as "user devices 210," and individually as "user device 210"), network 220, content sources 230-1, 230-2, . . . , 230-M (where M>1) (hereinafter referred to collectively as "content sources 230," an individually as "content source 230), and content injection system 240.

User device 210 may include any time or combination of computing and/or communication device. For example, user device 210 may include a laptop computer, a desktop computer, a tablet computer, a smart phone, a server, or another type of computing and/or communication device. As depicted, computing device 210 may be capable of communicating with network 220.

Network 220 may include any type of network or combination of networks. For example, network 220 may include a local area network (LAN) (e.g., an Ethernet network), a wireless LAN (WLAN) (e.g., an IEEE 802.11x network), a wide area network (WAN) (e.g., the Internet), and/or a wireless WAN (WWAN) (e.g., a Long-Term Evolution (LTE) network, a High-Speed Packet Access (HSPA) network, an Evolved High Rate Packet Data (eHRPD) network, etc.). Network 220 may also, or alternatively, include an IMS network, a fiber optic (e.g., a fiber optic service (FiOS)) network, a voice over Internet Protocol (VoIP) network, a metropolitan area network (MAN), an ad hoc network, a virtual network (e.g., a virtual private network (VPN)), and/or a telephone network (e.g., a Public Switched Telephone Network (PSTN)).

Content source 230 may include any type or combination of computing and/or communication device. For example, content source may include a desktop computer, a server, a cluster of servers, or another type of computing or communication device. In addition, content source 230 may be capable of communicating with network 220. For example, content source 230 may include a web server capable of providing web pages to computing device 210 via network 220.

Similarly, security injection system 240 may include any type or combination of computing and/or communication device. For example, security injection system 240 may include a router, a gateway, a desktop computer, a server, a proxy server, a cluster of servers, or another type of computing or communication device. In some implementations, security injection system 240 may be part of a system or network that enables computing device 210 to communicate with network 220 and/or content source 230. For example, security injection system 240 may be a gateway device within an access network, a particular server within service provider network, a proxy server corresponding to user device 210, a router within a MAN, etc. As such, communications between computing device 210 and content source 230 may be routed through, or may otherwise involve, security injection system 240.

While FIG. 2 shows a particular number and arrangement of networks and devices, in alternative implementations, environment 200 may include additional networks or devices, fewer networks or devices, different networks or devices, or differently arranged networks or devices than those depicted in FIG. 2.

Figure 3:
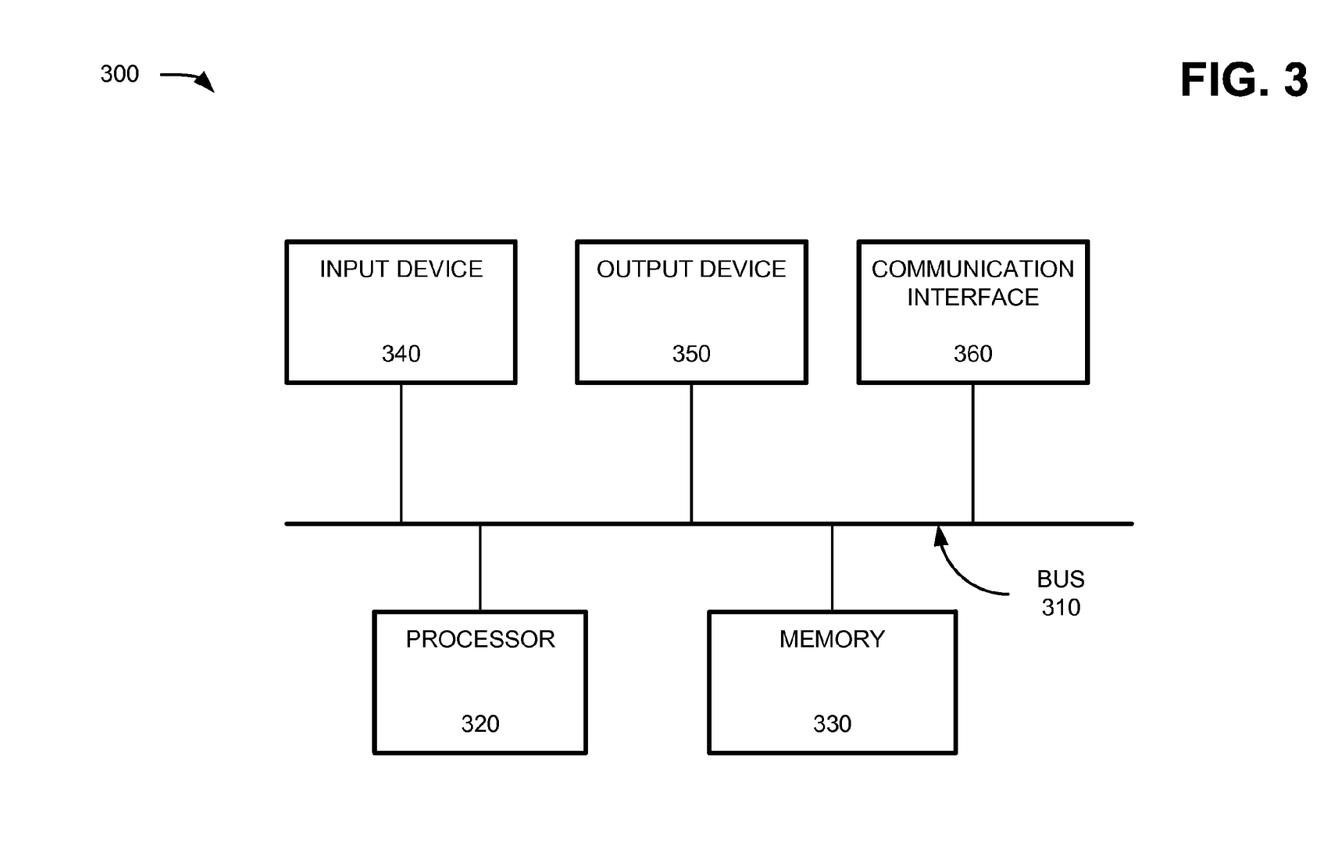
FIG. 3 is a diagram of an example device of FIG. 2 according to one or more implementations described herein.

FIG. 3 is a diagram of an example device of FIG. 2 according to one or more implementations described herein. For example, device 300 may correspond to computing device 210, content source 230, and/or security injection system 240. Each of computing device 210, content source 230, and/or security injection system 240 may include one or more devices 300 and/or one or more of the components of device 300.

As depicted, device 300 may include bus 310, processor 320, memory 330, input device 340, output device 350, and communication interface 360. However, the precise components of device 300 may vary between implementations. For example, depending on the implementation, device 300 may include fewer components, additional components, different components, or differently arranged components than those illustrated in FIG. 3.

Bus 310 may permit communication among the components of device 300. For example, bus 310 may include an arrangement of wires, circuitry, and/or another type of hardware that functionally connect the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 320 may control the overall operation, or a portion thereof, of device 300, based on, for example, an operating system (not illustrated) and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
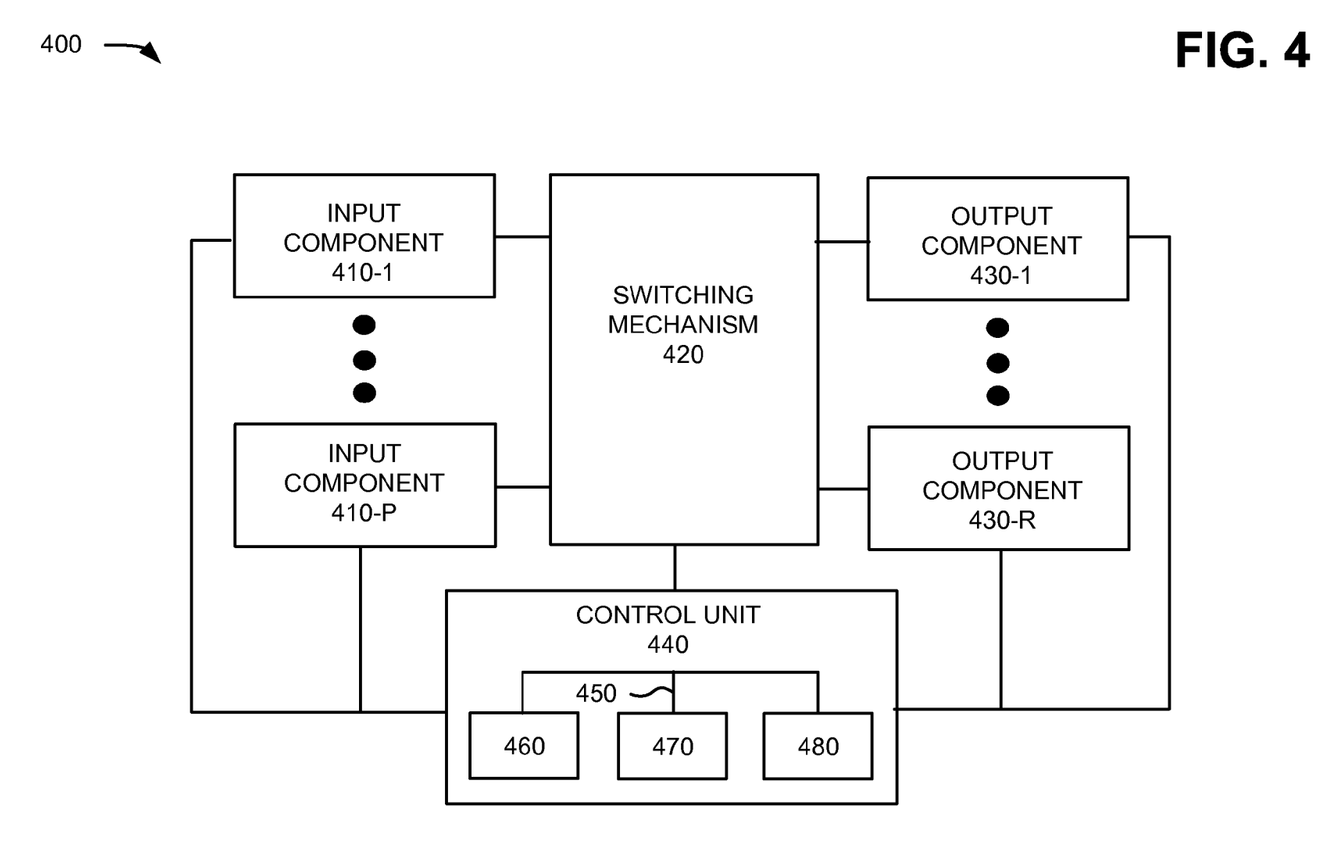
FIG. 4 is a diagram of an example network device of FIG. 2 according to one or more implementations described herein.

FIG. 4 is a diagram of an example network device 400 of FIG. 2 according to one or more implementations described herein. For example, since security injection system 240 may include a network device, such as a router, a gateway, etc., network device 400 may correspond to security injection system 240. In addition, security injection system 240 may include one or more network devices 400 and/or one or more of the components of network device 400.

As depicted, network device 400 may include input components 410-1, . . . , 410-Q (where P≥1) (collectively referred to as "input components 410," and individually as "input component 410"), switching mechanism 420, output components 430-1, . . . , 430-R (where R≥1) (collectively referred to as "output components 430," and individually as "output component 430"), and control unit 440 (which may include bus 450, processor 460, memory 470, and communication interface 480). However, the precise components of network device 400 may vary between implementations. For example, depending on the implementation, network device 400 may include fewer components, additional components, different components, or differently arranged components than those illustrated in FIG. 4.

Input components 410 may be points of attachment for physical links and may be the points of entry for incoming traffic. Input components 410 may perform datalink layer encapsulation and/or decapsulation. Input components 410 may look up a destination address of incoming traffic (e.g., any type or form of data, such as packet data or non-packet data) in a forwarding table (e.g., a media access control (MAC) table) to determine a destination component or a destination port of the data (e.g., a route lookup). In order to provide quality of service (QoS) guarantees, input ports 410 may classify traffic into predefined service classes. Input ports 410 may run datalink-level protocols and/or network-level protocols.

Switching mechanism 420 may include a switching fabric that provides links between input components 410 and output components 430. For example, switching mechanism 420 may include a group of switching devices that route traffic from input components 410 to output components 430.

Output components 430 may store traffic and may schedule traffic on one or more output physical links. Output components 430 may include scheduling algorithms that support priorities and guarantees. Output components 430 may support datalink layer encapsulation and decapsulation, and/or a variety of higher-level protocols.

Control unit 440 may interconnect with input components 410, switching mechanism 420, and output components 430. Control unit 440 may perform control plane processing, including computing and updating forwarding tables, manipulating QoS tables, maintaining control protocols, etc. Control unit 440 may process any traffic whose destination address may not be found in the forwarding table.

In one embodiment, control unit 440 may include a bus 450 that may include one or more paths that permits communication among processor 460, memory 470, and communication interface 480. Processor 460 may include a microprocessor or processing logic (e.g., an application specific integrated circuit (ASIC), field programmable gate array (FPGA), etc.) that may interpret and execute instructions, programs, or data structures. Processor 460 may control operation of network device 120 and/or one or more of the components of network device 400.

Memory 470 may include a random access memory (RAM) or another type of dynamic storage device that may store information and/or instructions for execution by processor 460, a read only memory (ROM) or another type of static storage device that may store static information and/or instructions for use by processor 460, a flash memory (e.g., an electrically erasable programmable read only memory (EEPROM)) device for storing information and/or instructions, and/or some other type of magnetic or optical recording medium and its corresponding drive. Memory 470 may also store temporary variables or other intermediate information during execution of instructions by processor 460.

Communication interface 480 may include any transceiver-like mechanism that enables control unit 440 to communicate with other devices and/or systems. For example, communication interface 480 may include a modem or an Ethernet interface to a LAN. Additionally or alternatively, communication interface 480 may include mechanisms for communicating via a wireless network (e.g., a WLAN and/or a WWAN). Communication interface 480 may also include a console port that may allow a user to interact with control unit 440 via, for example, a command line interface. A user may configure network device 120 via a console port (not shown in FIG. 4).

Network device 400 may perform certain operations, as described in detail herein. Network device 400 may perform these operations in response to, for example, processor 460 executing software instructions (e.g., computer program(s)) contained in a computer-readable medium, such as memory 470, a secondary storage device (e.g., hard disk, CD-ROM, etc.), or other forms of RAM or ROM. A computer-readable medium may be defined as a non-transitory memory device. A memory device may include memory space within a single physical memory device or spread across multiple physical memory devices.

The software instructions may be read into memory 470 from another computer-readable medium, such as a data storage device, or from another device via communication interface 480. The software instructions contained in memory 470 may cause processor 460 to perform processes that will be described later. Alternatively, hardwired circuitry may be used in place of, or in combination with, software instructions to implement processes described herein. Thus, implementations described herein are not limited to any specific combination of hardware circuitry and software.

Figure 5:
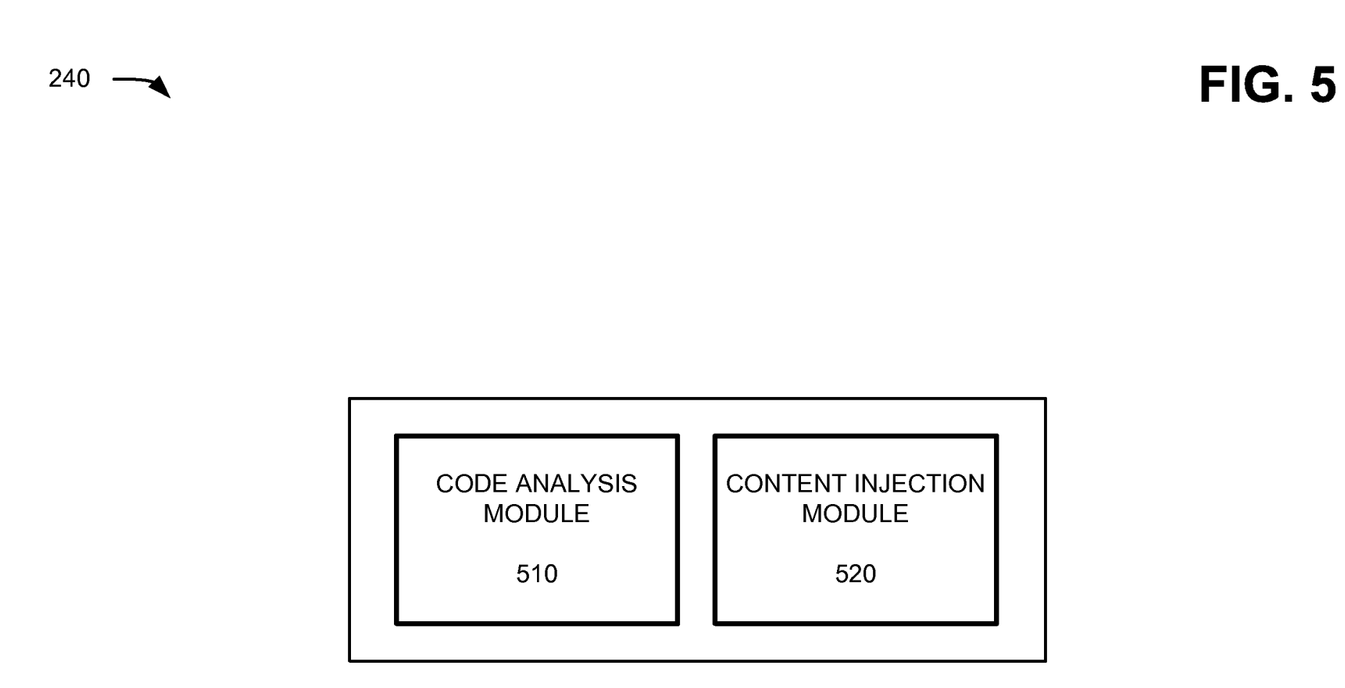
FIG. 5 is a diagram of example functional components of a security injection system according to one or more implementations described herein.

FIG. 5 is a diagram of example functional components of a security injection system 240 according to one or more implementations described herein. As depicted, security injection system 240 may include code analysis module 510 and content injection module 520. Depending on the implementation, one or more of modules 510-520 may be implemented as a combination of hardware and software based on the components illustrated and described with respect to FIGS. 3 and/or 4. Alternatively, modules 510-520 may each be implemented as hardware based on the components illustrated and described with respect to FIGS. 3 and/or 4.

Code analysis module 510 may provide functionality regarding analyzing software code. For example, code analysis module 510 may enable security injection system 240 to analyze software code corresponding to a web page or another type of data structure being sent to computing device 210. In one example, code analysis module 510 may enable security injection system to receive software code corresponding to a web page, analyze the software code to determine what type of security content would be appropriate for the web page, and/or determine a location for injecting the security content into the web page.

Content injection module 520 may provide functionality with respect to injecting security content. For example, content injection module 520 may enable security injection system 240 to inject security content into a web page or another type of data structure. In one example, content injection module 520 may cooperate with code analysis module 510 to determine a location within the web page for injecting the security content and injecting the security content into the web page. Injecting the proper security content at the proper location within the web page may help ensure that the security content is executed by the browser at an appropriate time (e.g., before any potentially malicious content is executed).

In addition to the functionality described above, the functional components of content injection module 520 may also, or alternatively, provide functionality as described elsewhere in this description. Further, while FIG. 5 shows a particular number and arrangement of modules, in alternative implementations, content injection module 520 may include additional modules, fewer modules, different modules, or differently arranged modules than those depicted.

Figure 6:
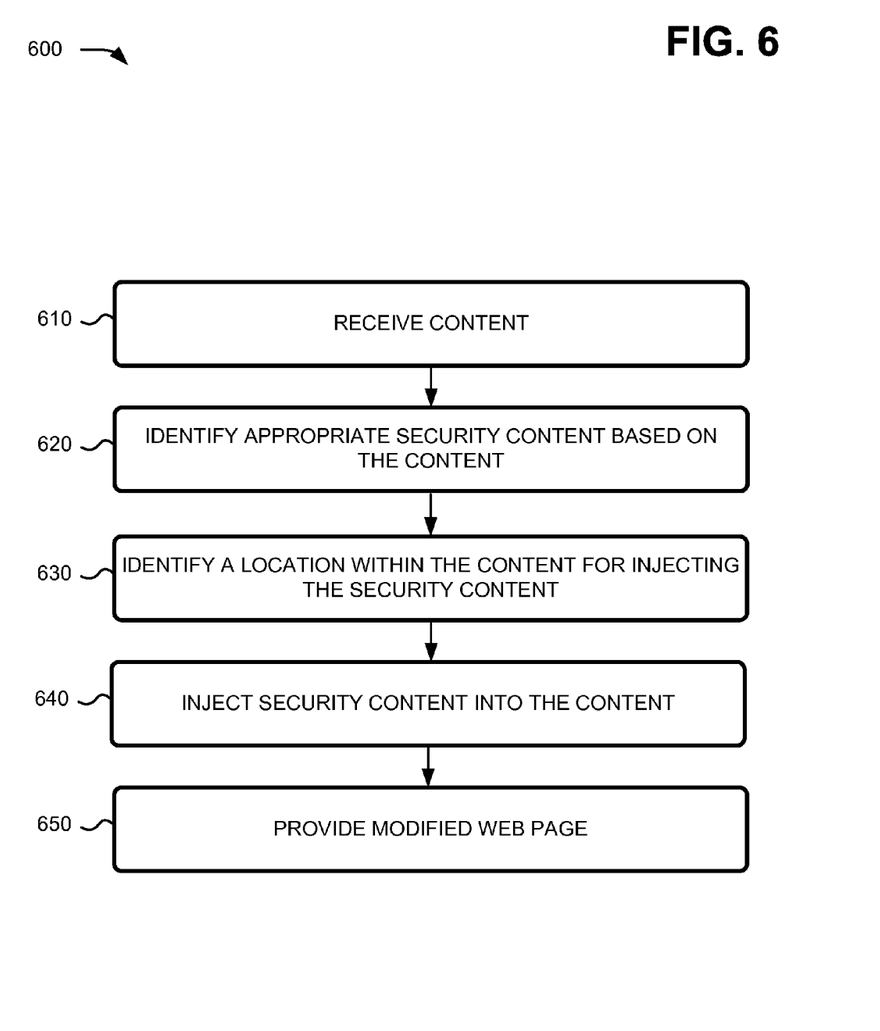
FIG. 6 is a diagram of an example process for injecting security content according to one or more implementations described herein.

FIG. 6 is a diagram of an example process for injecting security content according to one or more implementations described herein. In one or more implementations, process 600 may be performed by one or more components of security injection system 240. In other implementations, some or all of process 600 may be performed by one or more other components/devices, or a group of components/devices, including or excluding security injection system 240.

As depicted in FIG. 6, process 600 may include receiving content (block 610). For example, security injection system 240 may receive content. As mentioned above, the content may include a web page, and injection security system 240 may receive the web page from a web server. In one implementation security injection system 240 may receive a web page from a web server. However, the content may also, or alternatively, include any type of software code that may be executed within a web browser, and the content source may include any device or group of devices capable of providing the content to security injection system 240 and/or computing device 210.

Process 600 may also include identifying appropriate security content based on the content (block 620). For example, security injection system 240 may identify appropriate security content based on the content. In one example, the security injection system 240 may identify the appropriate security by matching a type of software code corresponding to the content with a type of software code corresponding to the security content. For instance, security injection system 240 may analyze the web page and determine that the web page includes software code corresponding to Hypertext Markup Language (HTML) and/or JavaScript. In such a scenario, security injection system 240 may, therefore, identify security content written in JavaScript for injecting security content into the web page.

As depicted in FIG. 6, process 600 may also include identifying a location within the content for injecting the security content. For example, security injection system 240 may identify a location within the content for injecting the security content. In one example, security injection system 240 may identify the location within the content that will be executed by the browser first (e.g., at or near the top of the web page). In one example, the security injection system 240 may determine an execution chronology corresponding to the content (e.g., which portion of the content will be executed by the web browser first, which portion of the content will be executed by the web browser second, etc.), identify portions of the content that may be more likely to include malicious content, and identify the location for injecting the content based on the execution chronology and/or the likelihood of malicious content corresponding to each portion of the content.

Process 600 may also, or alternatively, include injecting the security content into the content (block 640). For example, security injection system 240 may inject the security content into the content. In one example, the security injection system 240 may inject the security content into the content by modifying the content with the security content. In one implementations, security content may be written in a software language that is the same as, or is functionally complementary to, the software language used to write the content. Injecting the security content in a manner that is complementary to the existing content may help ensure that the web browser is capable of seamlessly executing the web page (e.g., the security content and the content).

As depicted in FIG. 6, process 600 may include providing the modified web page (block 650). For example, security injection system 240 may provide the modified web to computing device 210 via network 220. As such, process 600 provides a solution to protecting a computing device from malicious content by injecting, inserting, or otherwise modifying the content to include security content capable of being executed by a web browser to detect and prevent the malicious content from attacking or infecting the computing device.

While FIG. 6 shows a flowchart diagram of an example process 600 for injecting security content, in other implementations, a process for injecting security content may include fewer operations, different operations, differently arranged operations, or additional operations than depicted in FIG. 6.

Figure 7:
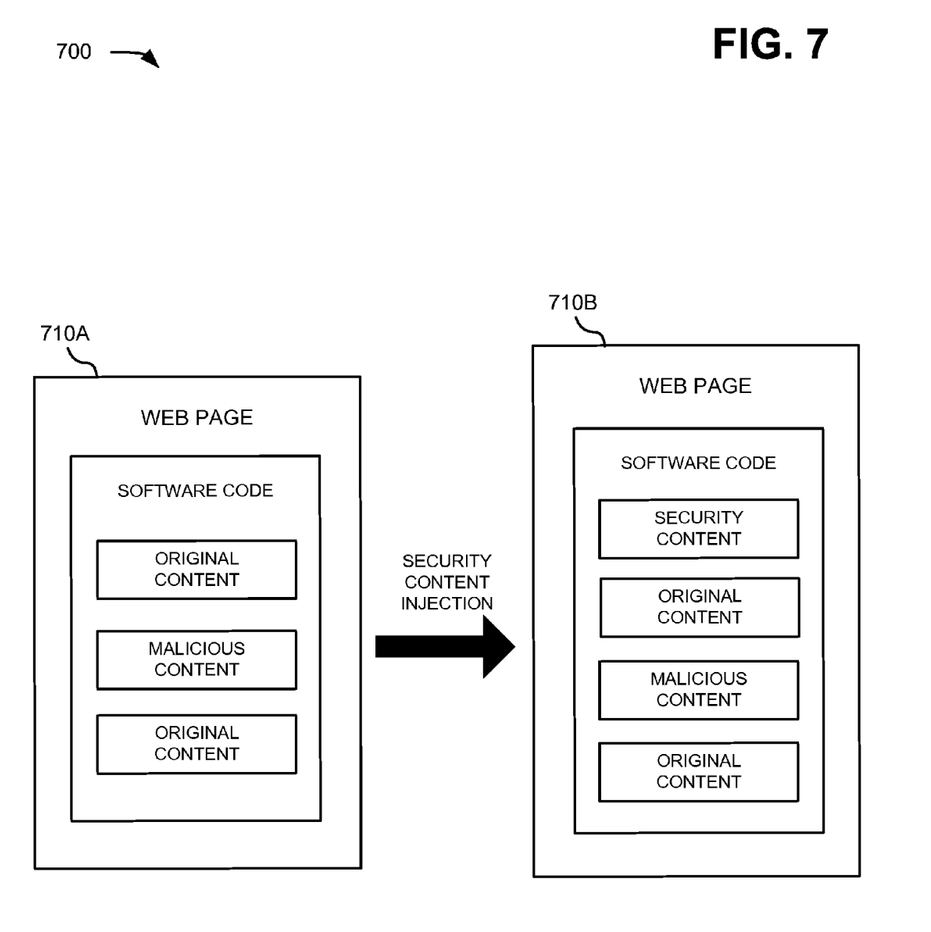
FIG. 7 is a diagram of example web pages according to one or more implementations described herein.

FIG. 7 is a diagram of an example security content injection operation 700 according to one or more implementations described herein. In one or more implementations, operation 700 may be performed by one or more components of security injection system 240. In other implementations, some or all of operation 700 may be performed by one or more other components/devices, or a group of components/devices, including or excluding security injection system 240.

Web page 710A may represent a web page as received by security injection system 240 from content source 230, and web page 710B may represent the web page as sent from security injection system 240 to computing device 210. As depicted in FIG. 7, security content injection operation 700 may include injecting or inserting security content into the software code of the web page.

As mentioned above, the security content may be capable of detecting the malicious content in the web page, notifying computing device 210 of the malicious content, and/or protecting computing device 210 form the malicious content. As depicted in FIG. 7, the security content may be inserted at or near the top of web page 710B. In some implementations, inserting the security content at or near the top of web page 710B may ensure that the security content is executed prior to the malicious content, thereby providing the security content to establish a safe execution environment for detecting the malicious code without permitting the malicious content to harm computing device 210.

Figure 8:
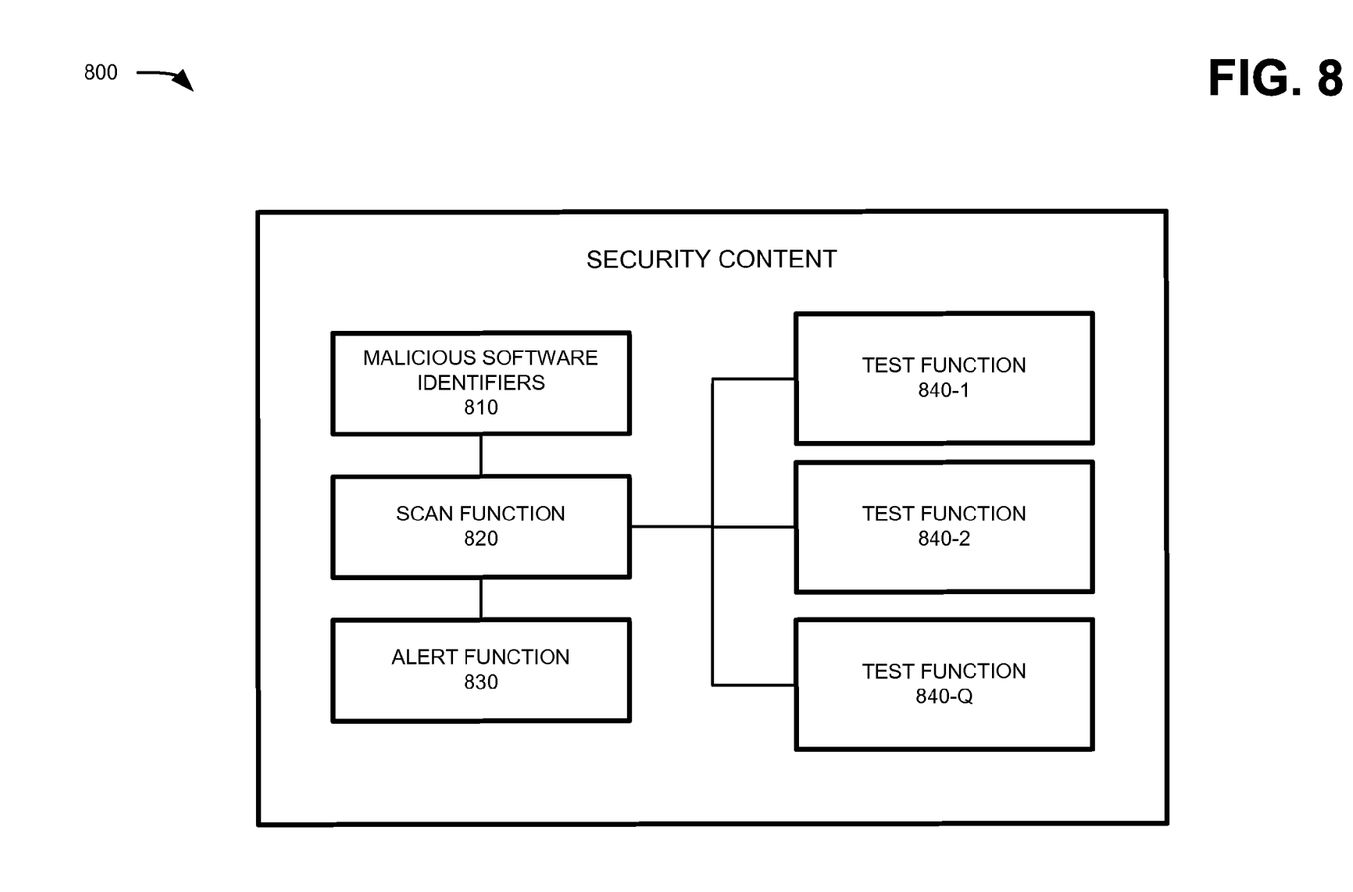
FIG. 8 is a diagram of injected security content according to one or more implementations described herein.

FIG. 8 is a diagram of example security content 800 according to one or more implementations described herein. As depicted, security content 800 may include malicious software identifiers 810, a scan function 820, an alert function 830, and test functions 840-1, 840-2, ... 840-Q (where Q≥1) (hereinafter referred to collectively as "standard functions 840," and individually as "standard function"). The features of security content 800 are provided for exemplary purposes only. In practice security content may include additional features, alternative features, or a different arrangement of features then depicted in FIG. 8.

Malicious software identifiers 810 may include one or more signatures, segments of software code, or other data structures for identifying malicious content. Scan function 820 may include one or more instructions for scanning a portion of software code and/or an output of test function 840, for malicious software (e.g., malicious software identifies by malicious software identifiers 810). Alert function may include software instructions and/or another type of logical instructions for notifying computing device 210, or a user of computing device 210, regarding the detection of malicious software.

Test function 840 may include one or more functions that are known, currently exist, or are otherwise compatible with a particular type of software code or software language (e.g., HTML, JavaScript, etc.). For instance, examples of test function 840 may include JavaScript functions, such as an UNESCAPE function, an EVAL function, or a WRITE function. In one example, the foregoing functions, or other types of functions, may be capable of executing, processing, or otherwise interacting with one or more portions of software code (e.g., malicious software code) and, in cooperation with scan function 820, detect the presence of malicious content that may be embedded within web page 710.

Accordingly, system and/or devices, described herein, may be used to protect computing devices from malicious software content. A network device, such as security injection system 240, may receive a web page, or another type of content, from a web server or another type of content source 230. The network device may inject security content into the content receive from content source 230, and the security content may be executed by a browser of the device requesting the content (e.g., computing device 210). The security content may include malicious software identifiers, scanning functions, and/or alert functions for identifying malicious software that may be embedded in the content. Additionally, or alternatively, the security content may include standard function that are rewritten and/or augmented versions of software code that is compatible with the content. Such functions may be capable of executing software code and/or scanning the results of executed software code in order to identify malicious content that may be hidden within the content requested by computing device 210.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a first device, content,
the content being directed to a second device;
identifying, by the first device, a location within the content for injecting security content into the content;
injecting, by the first device and based on identifying the location, the security content into the content at the location to obtain modified content,
the security content comprising one or more instructions to enable the second device to detect malicious content within the modified content; and
providing, by the first device, the modified content to the second device for the second device to detect the malicious content within the modified content by executing the security content within the modified content.

2. The method of claim 1, where the content includes software code.

3. The method of claim 1, where receiving the content includes:
receiving the content from a content source that provides web pages.

4. The method of claim 1, further comprising:
generating an alert based on the malicious content.

5. The method of claim 1, where the modified content prevents the malicious content from being executed by the second device.

6. The method of claim 1, where identifying the location within the content for injecting the security content comprises:
determining a chronological execution order of the content; and
identifying the location based on the chronological execution order of the content.

7. The method of claim 1, where the location is at a beginning of a chronological execution order of the content.

8. The method of claim 1, where the one or more instructions, of the security content, are in a programming language that is compatible with the content.

9. The method of claim 1, where the content is received by the first device after the second device requests the content.

10. A system comprising:
one or more processors to:
receive content from a first device,
the content being directed to a second device;
identify a location within the content for injecting security content into the content;
inject, based on identifying the location, the security content into the content at the location to obtain modified content,
the security content comprising one or more instructions to enable the second device to detect malicious content within the modified content; and
provide the modified content to the second device for the second device to detect the malicious content within the modified content by executing the security content within the modified content.

11. The system of claim 10,
where the security content further comprises malicious software identifiers for identifying the malicious content, and
where the malicious software identifiers include one or more signatures or one or more segments of software code.

12. The system of claim 10, where the security content further comprises an alert function to enable the second device to notify a user of the second device regarding the malicious content.

13. The system of claim 10, where the one or more processors are further to:
identify a type of code corresponding to the content, and
identify the security content based on the type of code.

14. The system of claim 10, where the security content further includes one or more instructions to enable the second device to remove the malicious content from the modified content.

15. The system of claim 10, where, when identifying the location within the content for injecting the security content, the one or more processors are to:
identify a likelihood of the malicious content corresponding to one or more portions of the content, and
identify the location based on the likelihood.

16. The system of claim 10, where, when identifying the location within the content for injecting the security content, the one or more processors are to:
identify an execution chronology corresponding to the content, and
identify the location based on the execution chronology.

17. A non-transitory computer-readable medium storing instructions, the instructions comprising:
one or more instructions that, when executed by at least one processor, cause the at least one processor to:
receive content from a server,
the content being directed to a device;
identify a location within the content for injecting security content into the content;
inject, based on identifying the location, the security content into the content at the location to obtain modified content,
the security content comprising one or more instructions to enable the device to detect malicious content within the modified content; and
provide the modified content to the device for the device to detect the malicious content within the modified content by executing the security content within the modified content.

18. The non-transitory computer-readable medium of claim 17, where the security content prevents the malicious content from operating within the device.

19. The non-transitory computer-readable medium of claim 17, where the instructions further comprise:
   one or more instructions that, when executed by the at least one processor, cause the at least one processor to:
     determine a type of software code corresponding to the content, and
     identify the security content based on the type of software code.

20. The non-transitory computer-readable medium of claim 17, where the one or more instructions to identify the location within the content for injecting the security content comprises:
   one or more instructions that, when executed by the at least one processor, cause the at least one processor to:
     determine an execution chronology corresponding to the content; and
     identify the location based on the execution chronology corresponding to the content.

* * * * *